(12) United States Patent
Shang et al.

(10) Patent No.: US 11,861,923 B2
(45) Date of Patent: Jan. 2, 2024

(54) METHODS, APPARATUSES, AND COMPUTER-READABLE STORAGE MEDIA FOR IMAGE-BASED SENSITIVE-TEXT DETECTION

(71) Applicant: HUAWEI TECHNOLOGIES CO., LTD., Guangdong (CN)

(72) Inventors: Zhiwei Shang, Waterloo (CA); Tongyu Ge, Waterloo (CA); Zhijun Mo, Waterloo (CA)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/566,817

(22) Filed: Dec. 31, 2021

(65) Prior Publication Data

US 2023/0215202 A1 Jul. 6, 2023

(51) Int. Cl.
*G06V 30/19* (2022.01)
*H04N 1/44* (2006.01)
*G06V 30/12* (2022.01)
*G06V 30/164* (2022.01)

(52) U.S. Cl.
CPC ........ *G06V 30/19093* (2022.01); *G06V 30/12* (2022.01); *G06V 30/164* (2022.01); *H04N 1/448* (2013.01)

(58) Field of Classification Search
CPC ............. G06V 30/19093; G06V 30/12; G06V 30/164; H04N 1/448
See application file for complete search history.

(56) References Cited

U.S. PATENT DOCUMENTS

| 2006/0078200 A1* | 4/2006 | Koyama ............ G06V 30/2455 382/181 |
| 2007/0299664 A1* | 12/2007 | Peters ..................... G06F 40/16 704/235 |
| 2010/0074509 A1 | 3/2010 | Laaser |

(Continued)

FOREIGN PATENT DOCUMENTS

| CN | 102332028 A | 1/2012 |
| CN | 113688837 A | 11/2021 |

OTHER PUBLICATIONS

Takabatake, Y., Tabei, Y., Sakamoto, H., "Online Pattern Matching for String Edit Distance with Moves," 2014, arXiv, p. 1-13. (Year: 2014).*

(Continued)

*Primary Examiner* — Amandeep Saini
*Assistant Examiner* — Daniella M. DiGuglielmo
(74) *Attorney, Agent, or Firm* — Locke Lord LLP; Tim Tingkang Xia, Esq.

(57) ABSTRACT

The present disclosure describes a method, an apparatus, and a non-transitory computer-readable medium for detecting sensitive text information such as privacy-related text information from a signal and modifying the signal by removing the detected sensitive text information therefrom. The apparatus receives the signal such as an image, a video clip, or an audio clip, and recognizes a text string therefrom. The apparatus then detects, from the text string, a substring based on a similarity between the substring and a regular expression, and modifies the signal by removing information related to the detected substring from the signal.

17 Claims, 4 Drawing Sheets

(56) References Cited

U.S. PATENT DOCUMENTS

| | | | | |
|---|---|---|---|---|
| 2013/0080164 A1* | 3/2013 | Zanolin | ................ | G06F 40/232 |
| | | | | 704/E15.044 |
| 2015/0161467 A1* | 6/2015 | Honda | ................ | G06V 40/161 |
| | | | | 382/203 |
| 2016/0217186 A1* | 7/2016 | Agarwal | ................ | G06F 16/22 |
| 2020/0349202 A1* | 11/2020 | Shin | ................ | G06F 16/90344 |

OTHER PUBLICATIONS

PCT International Search Report in Respect of International Application PCT/CN2022/131009, Jan. 17, 2023.
"Presidio—Data Protection and De-identification SDK" Microsoft Presidio, retrieved from the Internet Jul. 17, 2023.
"Regular Expression" Retrieved from Wikipedia Jul. 17, 2023.
"Fuzzy matching algorithm (also called approximate string matching or fuzzy string searching)" Retrieved from Wikipedia Jul. 17, 2023.
"Levenshtein distance" Retrieved from Wikipedia Jul. 17, 2023.
Belazzougui, Djamal et al. "Approximate regular expression matching with multi-strings." In International symposium on string processing and information retrieval, 2011, pp. 55-66. Springer, Berlin, Heidelberg.
Wu, Sun et al. "A Sub-Quadratic Algorithm for Approximate Regular Expression Matching." Journal of Algorithms 19, No. 3, 1995, pp. 346-360.
Jaume, G. et al. "FUNSD: A Dataset for Form Understanding in Noisy Scanned Documents," 2019.
"Overview—ICDAR 2019 Robust Reading Challenge on Scanned Receipts OCR and Information Extraction" Retrieved from the Internet on Jul. 17, 2023.
"Resident Identity Card" Retrieved from Wikipedia Jul. 17, 2023.
"Digital image processing" Retrieved from Wikipedia Jul. 17, 2023.

* cited by examiner

| Dataset | private dataset | | | | FUNSD (open dataset) | | | | SROIE (open dataset) | | | |
|---|---|---|---|---|---|---|---|---|---|---|---|---|
| Image type | Screen shot | | | | Scanned documents | | | | Scanned receipts | | | |
| Text Class | IP address | | | | Phone number | | | | Date | | | |
| Metrics | Precision | Recall | F1 | Time(s) | Precision | Recall | F1 | Time(s) | Precision | Recall | F1 | Time(s) |
| Presidio | 99% | 72% | 83% | 1.393 | 89% | 57% | 69% | 0.671 | 99% | 74% | 85% | 1.201 |
| Our Invention Fuzziness=1 | 98% | 82% (+10%) | 89% (+6%) | 1.372 | 86% | 75% (+18%) | 80% (+11%) | 0.649 | 96% | 77% (+3%) | 86% (+1%) | 1.185 |
| Our Invention Fuzziness=2 | 82% | 85% (+13%) | 84% (+1%) | 1.375 | 83% | 82% (+25%) | 83% (+14%) | 0.651 | 59% | 84% (+10%) | 69% | 1.187 |
| Our Invention Fuzziness=3 | 18% | 90% (+18%) | 30% | 1.394 | 59% | 87% (+30%) | 54% | 0.653 | 33% | 85% (+11%) | 48% | 1.193 |

FIG. 7

METHODS, APPARATUSES, AND COMPUTER-READABLE STORAGE MEDIA FOR IMAGE-BASED SENSITIVE-TEXT DETECTION

FIELD OF THE DISCLOSURE

The present disclosure relates generally to methods, apparatuses, and computer-readable storage media for image-based sensitive-text detection, and in particular to methods, apparatuses, and computer-readable storage media for image-based sensitive-text detection using fuzzy matching.

BACKGROUND

A large number of images are transferred through various communication networks such as the Internet everyday between users and service providers and between users and users. For example, a smart device or smartphone may capture an image using the camera thereof and then uploads it to the cloud (such as online storages offered by various providers) or websites (such as various social media websites) automatically or under the user's instructions.

Some of these images may contain sensitive text information such as phone number, email addresses, social security numbers, credit card numbers, bank account information, health information, and/or the like, and may need to be sanitized for privacy protection.

Generally, the first step of sanitizing such an image is image-based sensitive-text detection, that is, detecting and classifying sensitive text information and localize the positions thereof within the image. After detection, the detected text information may be wiped off, masked, or otherwise removed from the images using any suitable technologies.

SUMMARY

According to one aspect of this disclosure, there is provided a method for modifying a signal, the method comprising: recognizing a text string from the signal; detecting, from the text string, a substring based on a similarity between the substring and a regular expression; and modifying the signal by removing information related to the detected substring from the signal.

In some embodiments, the signal comprises an image, a frame of a video clip, or an audio clip.

In some embodiments, the method further comprises processing the signal for correcting distortion to remove noise in the signal.

In some embodiments, the method further comprises verifying correctness of the detected substring.

In some embodiments, said detecting the substring comprises: detecting, from the text string, the substring if an edit distance between the substring and the regular expression is smaller than a predefined threshold.

In some embodiments, the edit distance is a Levenshtein distance between the substring and the regular expression.

In some embodiments, said detecting the substring comprises: detecting, from the text string, the substring if a smallest Levenshtein distance between the substring and a final state in a Thompson's nondeterministic finite automaton (NFA) corresponding to the regular expression is smaller than the predefined threshold.

In some embodiments, the regular expression corresponds to a predefined type of text.

According to one aspect of this disclosure, there is provided a method comprising: detecting, from a text string, a substring based on a similarity between the substring and a regular expression.

According to one aspect of this disclosure, there is provided an apparatus for executing instructions to perform actions for modifying a signal, the actions comprising: recognizing a text string from the signal; detecting, from the text string, a substring based on a similarity between the substring and a regular expression; and modifying the signal by removing information related to the detected substring from the signal.

According to one aspect of this disclosure, there is provided one or more non-transitory computer-readable storage media comprising computer-executable instructions for modifying a signal, wherein the instructions, when executed, cause a processing structure to perform actions comprising: recognizing a text string from the signal; detecting, from the text string, a substring based on a similarity between the substring and a regular expression; and modifying the signal by removing information related to the detected substring from the signal.

The above described methods, apparatus, and one or more non-transitory computer-readable storage devices may be used for detecting sensitive text information such as privacy-related text information from a signal such as an image, a video clip, or an audio clip, and modifying the signal by removing the detected sensitive text information therefrom.

The above described methods, apparatus, and one or more non-transitory computer-readable storage devices provide robust image-based sensitive-text detection with improved detection rates while maintaining sufficient correctness of sensitive-text detection.

BRIEF DESCRIPTION OF THE DRAWINGS

For a more complete understanding of the disclosure, reference is made to the following description and accompanying drawings, in which:

FIG. 7 is a table showing comparison results of a conventional image-based sensitive-text detection system and the image-sanitization system shown in FIG. 1.

DETAILED DESCRIPTION

Figure 1:
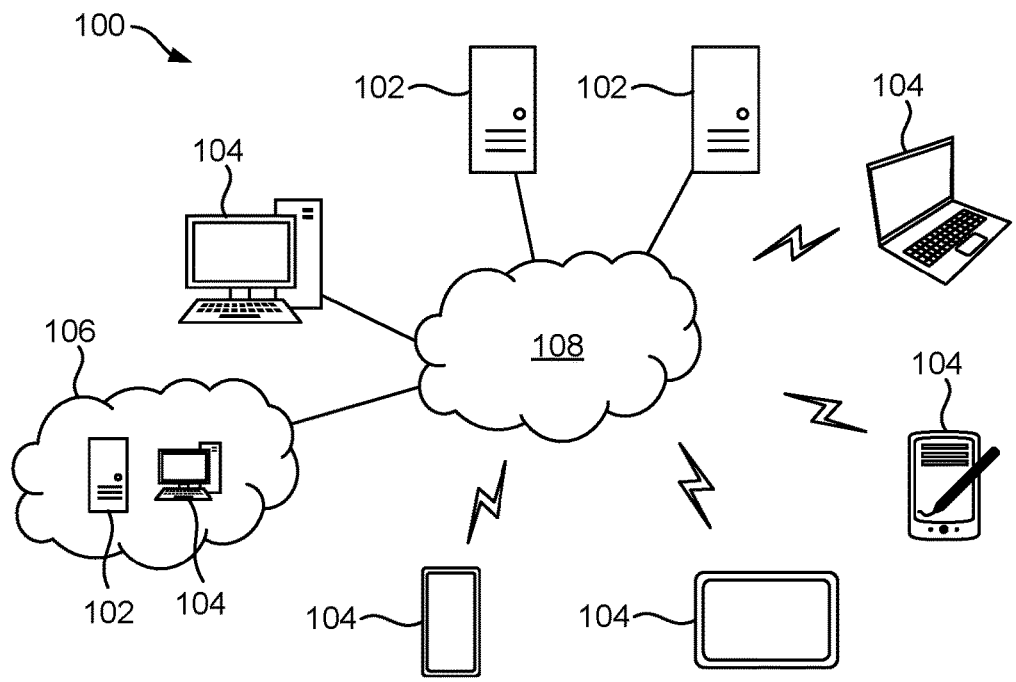
FIG. 1 is a schematic diagram of a computer network system for sanitizing images to remove sensitive text information therein, according to some embodiments of this disclosure.

Embodiments disclosed herein relate to methods, apparatuses, and computer-readable storage media for processing images to detect sensitive text information therein. Herein, sensitive text information refers to text information of one or more predefined types such as IP address, birthday, phone number, email addresses, home addresses, social security numbers, credit card numbers, bank account information, health information, and/or the like.

In various embodiments, the methods, apparatuses, and computer-readable storage media disclosed herein are configured for detecting sensitive text information in input images of various image types (such as high-resolution digital images, low-resolution digital images, scanned documents, screenshots, and/or the like). The methods, apparatuses, and computer-readable storage media disclosed herein may also be used for detecting sensitive text information in video clips. Moreover, the methods, apparatuses, and computer-readable storage media disclosed herein may alternatively be used for extracting text information from images and/or video clips.

According to one aspect of this disclosure, the methods, apparatuses, and computer-readable storage media disclosed herein use a fuzzy matching method to detect sensitive text from one or more recognized text strings obtained from an input signal such as an image, a video clip, an audio clip, or the like, via suitable text recognition technologies such as optical character recognition (OCR) (for images and video clips), voice recognition (for audio clips), and/or the like.

The fuzzy matching method uses a regular expression to define the pattern of a sensitive-text type and detect, from the recognized text strings, one or more substrings sufficiently similar to the regular expression. In other words, the fuzzy matching method detects each of the one or more substrings based on the similarity between the substring and the regular expression. If the similarity between a substring and the regular expression is greater than a predefined similarity threshold, the substring is considered a piece of sensitive text. Alternatively, if the dissimilarity (also called fuzziness or error tolerance) between a substring and the regular expression is smaller than a predefined fuzziness threshold, the substring is considered a piece of sensitive text.

In some embodiments, the fuzzy match method uses the edit distance between the regular expression and a substring in the recognized text strings for measuring the fuzziness therebetween.

In some embodiments, the edit distance is the Levenshtein distance between the regular expression and a substring in the recognized text strings.

In some embodiments, the fuzziness threshold may be adjustable by a user. Higher fuzziness thresholds may be used in applications that require higher recall rates, or lower fuzziness thresholds may be used in applications that need to maintain higher precisions.

In some embodiments, the detected pieces of sensitive text of some sensitive-text types may be validated to verify the correctness of the detected sensitive text and reduce incorrect sensitive-text detections.

In some embodiments, the methods, apparatuses, and computer-readable storage media disclosed herein also process the input images before OCR to improve image quality.

In some embodiments, after processing the input images and detecting sensitive text therein, the methods, apparatuses, and computer-readable storage media disclosed herein may modify the input images by masking or removing the detected sensitive text.

The methods, apparatuses, and computer-readable storage media disclosed herein provide robust image-based sensitive-text detection with improved detection rates (also called "recall rates") while maintaining sufficient precisions (that is, the correctness of sensitive-text detection).

A. System Structure

Turning now to FIG. 1, a computer network system for sanitizing images to remove sensitive text information therein, is shown and is generally identified using reference numeral 100. In these embodiments, the image-sanitization system 100 is configured for receiving one or more images, recognizing text information in the received images, detecting sensitive text information such as IP address, birthday, phone number, email addresses, home addresses, social security numbers, credit card numbers, bank account information, health information, and/or the like in the recognized text information, and modifying the received images to remove the detected sensitive information.

As shown in FIG. 1, the image-sanitization system 100 comprises one or more server computers 102, a plurality of client computing devices 104, and one or more client computer systems 106 functionally interconnected by a network 108, such as the Internet, a local area network (LAN), a wide area network (WAN), a metropolitan area network (MAN), and/or the like, via suitable wired and wireless networking connections.

The server computers 102 may be computing devices designed specifically for use as a server, and/or general-purpose computing devices acting server computers while also being used by various users. Each server computer 102 may execute one or more server programs.

The client computing devices 104 may be portable and/or non-portable computing devices such as laptop computers, tablets, smartphones, Personal Digital Assistants (PDAs), desktop computers, and/or the like. Each client computing device 104 may execute one or more client application programs which sometimes may be called "apps".

Figure 2:
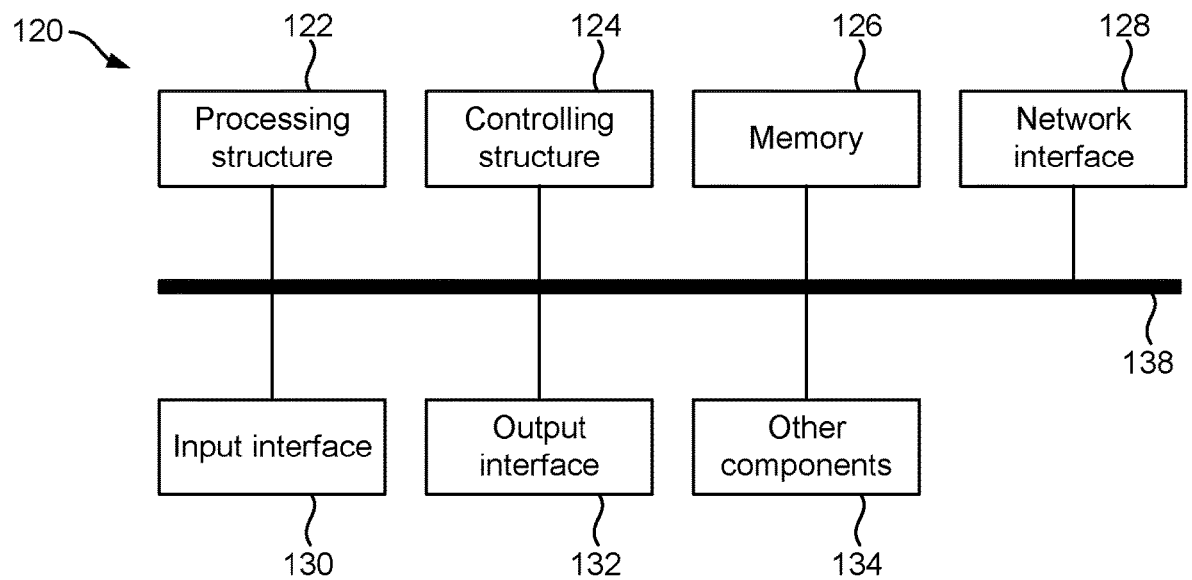
FIG. 2 is a schematic diagram showing a simplified hardware structure of a computing device of the computer network system shown in FIG. 1.

Generally, the computing devices 102 and 104 comprise similar hardware structures such as hardware structure 120 shown in FIG. 2. As shown, the hardware structure 120 comprises a processing structure 122, a controlling structure 124, one or more non-transitory computer-readable memory or storage devices 126, a network interface 128, an input interface 130, and an output interface 132, functionally interconnected by a system bus 138. The hardware structure 120 may also comprise other components 134 coupled to the system bus 138.

The processing structure 122 may be one or more single-core or multiple-core computing processors, generally referred to as central processing units (CPUs), such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like. When the processing structure 122 comprises a plurality of processors, the processors thereof may collaborate via a specialized circuit such as a specialized bus or via the system bus 138.

The processing structure 122 may also comprise one or more real-time processors, programmable logic controllers (PLCs), microcontroller units (MCUs), µ-controllers (UCs), specialized/customized processors, hardware accelerators, and/or controlling circuits (also denoted "controllers") using, for example, field-programmable gate array (FPGA) or application-specific integrated circuit (ASIC) technologies, and/or the like. In some embodiments, the processing structure includes a CPU (otherwise referred to as a host processor) and a specialized hardware accelerator which includes circuitry configured to perform computations of neural networks such as tensor multiplication, matrix multiplication, and the like. The host processor may offload some computations to the hardware accelerator to perform computation operations of neural network. Examples of a hardware accelerator include a graphics processing unit (GPU), Neural Processing Unit (NPU), and Tensor Process Unit (TPU). In some embodiments, the host processors and the hardware accelerators (such as the GPUs, NPUs, and/or TPUs) may be generally considered processors.

The controlling structure 124 comprises one or more controlling circuits, such as graphic controllers, input/output chipsets and the like, for coordinating operations of various hardware components and modules of the computing device 102/104.

The memory 126 comprises one or more storage devices or media accessible by the processing structure 122 and the controlling structure 124 for reading and/or storing instructions for the processing structure 122 to execute, and for reading and/or storing data, including input data and data generated by the processing structure 122 and the controlling structure 124. The memory 126 may be volatile and/or non-volatile, non-removable or removable memory such as RAM, ROM, EEPROM, solid-state memory, hard disks, CD, DVD, flash memory, or the like.

The network interface 128 comprises one or more network modules for connecting to other computing devices or networks through the network 108 by using suitable wired or wireless communication technologies such as Ethernet, WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, 5G New Radio (5G NR) and/or other 5G networks, and/or the like. In some embodiments, parallel ports, serial ports, USB connections, optical connections, or the like may also be used for connecting other computing devices or networks although they are usually considered as input/output interfaces for connecting input/output devices.

The input interface 130 comprises one or more input modules for one or more users to input data via, for example, touch-sensitive screen, touch-sensitive whiteboard, touch-pad, keyboards, computer mouse, trackball, microphone, scanners, cameras, and/or the like. The input interface 130 may be a physically integrated part of the computing device 102/104 (for example, the touch-pad of a laptop computer or the touch-sensitive screen of a tablet), or may be a device physically separate from, but functionally coupled to, other components of the computing device 102/104 (for example, a computer mouse). The input interface 130, in some implementation, may be integrated with a display output to form a touch-sensitive screen or touch-sensitive whiteboard.

The output interface 132 comprises one or more output modules for output data to a user. Examples of the output modules comprise displays (such as monitors, LCD displays, LED displays, projectors, and the like), speakers, printers, virtual reality (VR) headsets, augmented reality (AR) goggles, and/or the like. The output interface 132 may be a physically integrated part of the computing device 102/104 (for example, the display of a laptop computer or tablet), or may be a device physically separate from but functionally coupled to other components of the computing device 102/104 (for example, the monitor of a desktop computer).

The computing device 102/104 may also comprise other components 134 such as one or more positioning modules, temperature sensors, barometers, inertial measurement unit (IMU), and/or the like.

The system bus 138 interconnects various components 122 to 134 enabling them to transmit and receive data and control signals to and from each other.

Figure 3:
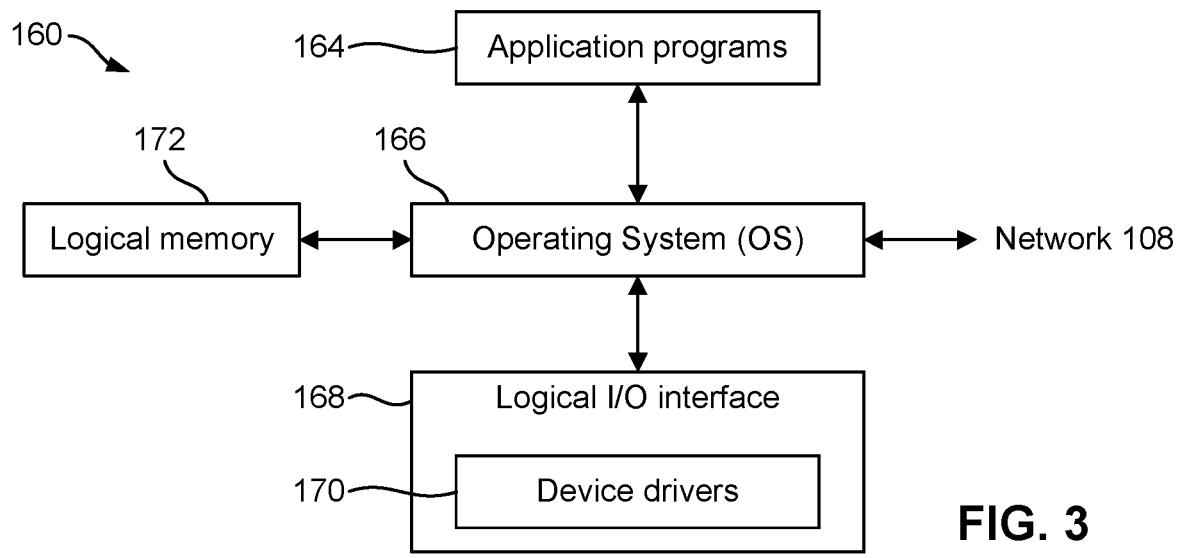
FIG. 3 a schematic diagram showing a simplified software architecture of a computing device of the computer network system shown in FIG. 1.

FIG. 3 shows a simplified software architecture 160 of the computing device 102 or 104. The software architecture 160 comprises one or more application programs 164, an operating system 166, a logical input/output (I/O) interface 168, and a logical memory 172. The one or more application programs 164, operating system 166, and logical I/O interface 168 are generally implemented as computer-executable instructions or code in the form of software programs or firmware programs stored in the logical memory 172 which may be executed by the processing structure 122.

The one or more application programs 164 executed by or run by the processing structure 122 for performing various tasks.

The operating system 166 manages various hardware components of the computing device 102 or 104 via the logical I/O interface 168, manages the logical memory 172, and manages and supports the application programs 164. The operating system 166 is also in communication with other computing devices (not shown) via the network 108 to allow application programs 164 to communicate with those running on other computing devices. As those skilled in the art will appreciate, the operating system 166 may be any suitable operating system such as MICROSOFT® WINDOWS® (MICROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDROID is a registered trademark of Google LLC, Mountain View, CA, USA), or the like. The computing devices 102 and 104 of the image-sanitization system 100 may all have the same operating system, or may have different operating systems.

The logical I/O interface 168 comprises one or more device drivers 170 for communicating with respective input and output interfaces 130 and 132 for receiving data therefrom and sending data thereto. Received data may be sent to the one or more application programs 164 for being processed by one or more application programs 164. Data generated by the application programs 164 may be sent to the logical I/O interface 168 for outputting to various output devices (via the output interface 132).

The logical memory 172 is a logical mapping of the physical memory 126 for facilitating the application programs 164 to access. In this embodiment, the logical memory 172 comprises a storage memory area that may be mapped to a non-volatile physical memory such as hard disks, solid-state disks, flash drives, and the like, generally for long-term data storage therein. The logical memory 172 also comprises a working memory area that is generally mapped to high-speed, and in some implementations volatile, physical memory such as RAM, generally for application programs 164 to temporarily store data during program execution. For example, an application program 164 may load data from the storage memory area into the working memory area, and may store data generated during its execution into the working memory area. The application program 164 may also store some data into the storage memory area as required or in response to a user's command.

In a server computer 102, the one or more application programs 164 generally provide server functions for managing network communication with client computing devices 104 and facilitating collaboration between the server computer 102 and the client computing devices 104. Herein, the term "server" may refer to a server computer 102 from a hardware point of view or a logical server from a software point of view, depending on the context.

As described above, the processing structure 122 is usually of no use without meaningful firmware and/or software. Similarly, while a computer system such as the image-sanitization 100 may have the potential to perform various tasks, it cannot perform any tasks and is of no use without meaningful firmware and/or software. As will be described in more detail later, the image-sanitization system 100 described herein, as a combination of hardware and software, generally produces tangible results tied to the physical world, wherein the tangible results such as those described herein may lead to improvements to the computer and system themselves.

B. Image-Based Sensitive-Text Detection

As described above, the one or more server computers 102 may receive various images from the client computing devices 104 or from sever computers of other computer network systems. The received images may contain sensitive text information. In these embodiments, sensitive text information refers to text in the image that is represented in the same form thereof (that is, text represented in the image form), and the content thereof or the type thereof is sensitive (for example, related to privacy, national security, and/or the like) and may need to be sanitized. Examples of sensitive text information may be IP address, birthday, phone number, email addresses, home addresses, social security numbers, credit card numbers, bank account information, health information, and/or the like.

Figure 4:
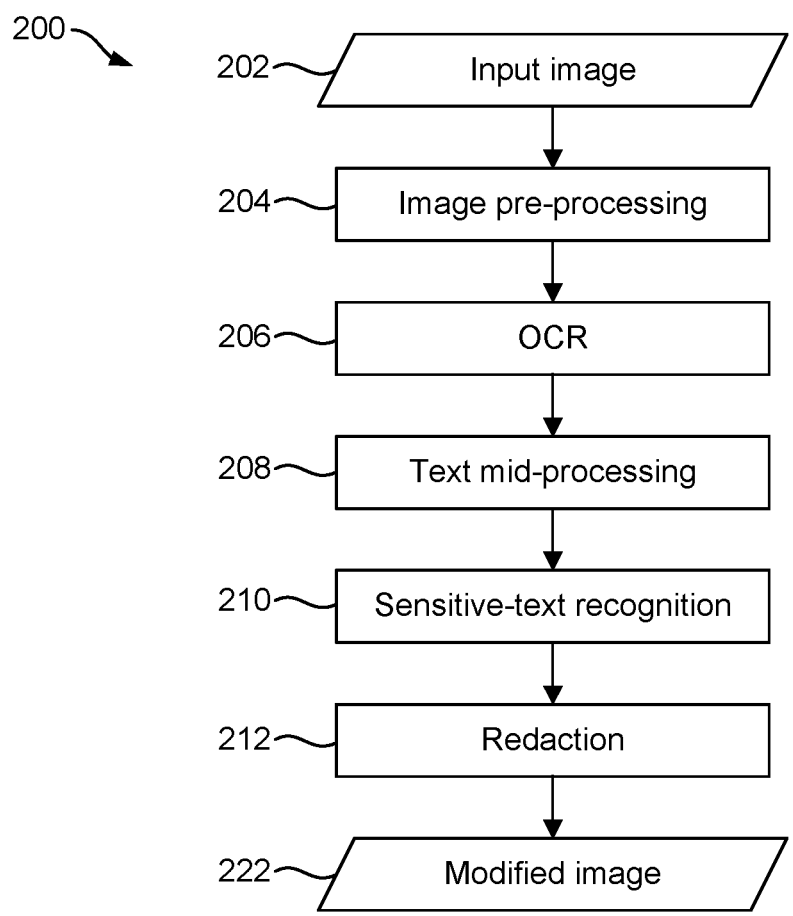
FIG. 4 is a flowchart showing an image-based sensitive-text detection and sanitization process executed by a processing structure of a server computer of the computer network system shown in FIG. 1.

FIG. 4 is a flowchart showing an image-based sensitive-text detection and sanitization process 200 executed by a processing structure 122 of a server computer 102 for receiving an input image 202 having text information, detecting sensitive text therein, and outputting a modified image with detected sensitive text information removed or otherwise sanitized. In these embodiments, sensitive text may be classified into a plurality of predefined types (denoted "sensitive-text type" hereinafter) such as IP address, birthday, phone number, email addresses, home addresses, social security numbers, credit card numbers, bank account information, health information, and/or the like.

At step 204, the processing structure 122 processes the input image 202 (such as rescaling, binarization, noise-removal, rotation, and/or the like) to improve image quality by correcting distortion thereof and/or removing noise therein.

At step 206, the processing structure 122 uses a suitable optical character recognition (OCR) method to recognize text information (such as typed, handwritten or printed text) in the input image 202 and output a list of bounding boxes. Each bounding box encloses one or more recognized text strings and indicates the position of the recognized text strings in the input image 202 such as the left-top position, width, and height of the bounding box in the input image 202.

At step 208, the processing structure 122 concatenates all recognized text strings into a long text string.

At step 210, the processing structure 122 detects substrings of sensitive text from the long text string and forms a list of detected substrings of sensitive text together with their sensitive-text types and their bounding boxes.

At step 212, the processing structure 122 uses the list of detected substrings of sensitive text obtained at step 210 to redact the input image 202 by removing the detected sensitive-text information (such as the image portions related to the detected substrings of sensitive text) therefrom using any suitable technologies (for example, by masking the detected sensitive-text information, wiping off the detected sensitive-text information, and/or the like), and then output a modified or sanitized image 222.

Figure 5:
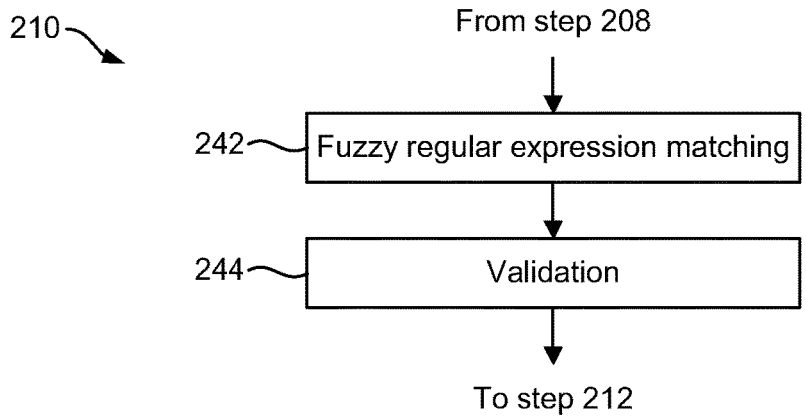
FIG. 5 shows the detail of a sensitive-text recognition step of the image-based sensitive-text detection and sanitization process shown in FIG. 4.

FIG. 5 shows the detail of step 210, wherein the processing structure 122 uses a fuzzy matching method (also called approximate string matching or fuzzy string searching) to detect sensitive text (step 242) and runs a validation function (if possible) to verify the correctness of the detected sensitive text and reduce incorrect sensitive-text detections (step 244). A brief review of approximate string matching may be found in https://en.wikipedia.org/wiki/Approximate_string_matching.

In these embodiments, the fuzzy matching method uses a regular expression (also denoted a "regex" hereinafter; see https://en.wikipedia.org/wiki/Regular_expression for a brief introduction) to define the pattern of a sensitive-text type and to detect, from the long text string, one or more substrings having sufficient similarities to the regular expression. When there are a plurality of sensitive-text types, a plurality of regular expressions may be defined each corresponding to a sensitive-text type. The processing structure 122 then uses the fuzzy matching method to detect, from the long text string, one or more substrings having sufficient similarities to each of the plurality of regular expressions.

As those skilled in the art understand, a regular expression is a sequence of characters defining a pattern of a text string. For example, the regular expression of "[a-z]" represents any lowercase letter between "a" and "z", the regular expression of "[0-9]" represents a digital between "0" and "9", and "?" representing that the preceding element may repeat zero or one time. Thus, one may use a regular expression to search a text string and find substrings matching the pattern defined by the regular expression. For example, one may use "[bc]?oat" to find "oat", "boat", and "coat".

However, the conventional regex-based text search only results in substrings of exact match. As OCR of a text image or the text portion of an image often has wrong character recognition (due to, for example, low image resolution), the conventional regex-based search may not find a sensitive text if the OCR thereof is wrong. For example, using the regular expression "[bc]?oat" would not successfully find the word "coat" in a text image if the OCR wrongfully recognized the word "coat" in the text image to "ooat".

Instead of finding substrings with exact match to the regular expression, the fuzzy matching method disclosed herein detects, from the long text string, substrings that are sufficiently similar to the pattern defined by the regular expression.

For example, in some embodiments, the fuzzy matching method uses a regular expression $P = p_1 p_2 \ldots p_m$ (which represents the pattern of a sensitive-text type) to find a substring $T_{j',j} = t_{j'} \ldots t_j$ of the sensitive text in the long text string $T=t_1 t_2 \ldots t_n$, which, of all substrings of T, has an acceptable edit distance to the regular expression P.

As those skilled in the art understand, edit distance is a measurement for quantifying the similarity or dissimilarity between strings, by counting the minimum number of operations required to transform one string into the other.

In these embodiments, the Levenshtein distance is used as the edit distance (see https://en.wikipedia.org/wiki/Levenshtein_distance for a brief introduction). A Levenshtein distance between two strings $s_1$ and $s_2$ is the minimum number of single-character edit operations needed to transform $s_1$ into $s_2$, where the possible edit operations include the deletion of a letter, the substitution of a letter by another letter, and the insertion of a letter. For example, the Levenshtein distance between the string "ooat" and the string "boat" is one (1) because one may edit "boat" by substituting the character "b" in "boat" with "o". Clearly, the minimum number of edit operations needed to transform $s_1$ into $s_2$ equals to the minimum number of edit operations needed to transform $s_2$ into $s_1$.

More specifically, the Levenshtein distance lev $(s_1, s_1)$ between string $s_1$ having a length (that is, number of characters) of $|s_1|$ and string $s_2$ having a length of $|s_2|$ is:

$$lev(s_1, s_2) = \begin{cases} |s_1|, & \text{if } |s_2| = 0; \\ |s_2|, & \text{if } |s_1| = 0; \\ lev(\text{tail}(s_1), \text{tail}(s_2)), & \text{if } s_1[0] = s_2[0]; \\ 1 + \min \begin{cases} lev(\text{tail}(s_1), s_2) \\ lev(s_1, \text{tail}(s_2)) \\ lev(\text{tail}(s_1), \text{tail}(s_2)) \end{cases}, & \text{otherwise}; \end{cases} \quad (1)$$

where s[0] represents the first character of string s, the function tail(s) outputs a substring of the string s from the second character of the string s to the last character thereof, and the tail function applied to a single character gives rise to an empty string (that is, its length is zero). The Levenshtein distance between a text string and a regular expression is the minimum number of single-character edit operations needed to transform the text string s into a string matching the regular expression P. For example, the Levenshtein distance between the string "ooat" and the regular expression of "[bc]?oat" is one (1) because one may edit "oat" (which is a text string matching the regular expression P) by inserting a character "o" at the beginning of "oat", or by substituting the character "b" or "c" in "boat" or "coat" (both "boat" and "coat" are text strings matching the regular expression P) with "o".

Thus, the Levenshtein distance represents the difference or dissimilarity between a regular expression and a text string, and is denoted the "fuzziness" or "error tolerance". A smaller fuzziness (that is, a smaller Levenshtein distance) implies lower dissimilarity or higher similarity between the text string and the regular expression. Therefore, the fuzzy matching method in these embodiments searches in the long text string T for substrings $T_{j'j}$ of sensitive-text with fuzziness or Levenshtein distance to the regular expression P smaller than a predefined fuzziness threshold (that is, smaller than a predefined Levenshtein-distance threshold).

In some embodiments, the fuzzy matching method uses Thompson's nondeterministic finite automaton (NFA) for detecting sensitive-text substrings $T_{j'j}$ in the long text string T.

The detail of Thompson's NFA may be found in the academic paper entitled "Approximate regular expression matching with multi-strings" to Belazzougui, Djamal, and Mathieu Raffinot and published in International Symposium on String Processing and Information Retrieval, pp. 55-66, Springer, Berlin, Heidelberg, 2001; and the academic paper entitled "A subquadratic algorithm for approximate regular expression matching" to Wu, Sun, Udi Manber, and Eugene Myers, and published in Journal of algorithms 19, no. 3 (1995): 346-360, the content of each which is incorporated herein by reference in its entirety.

Figure 6:
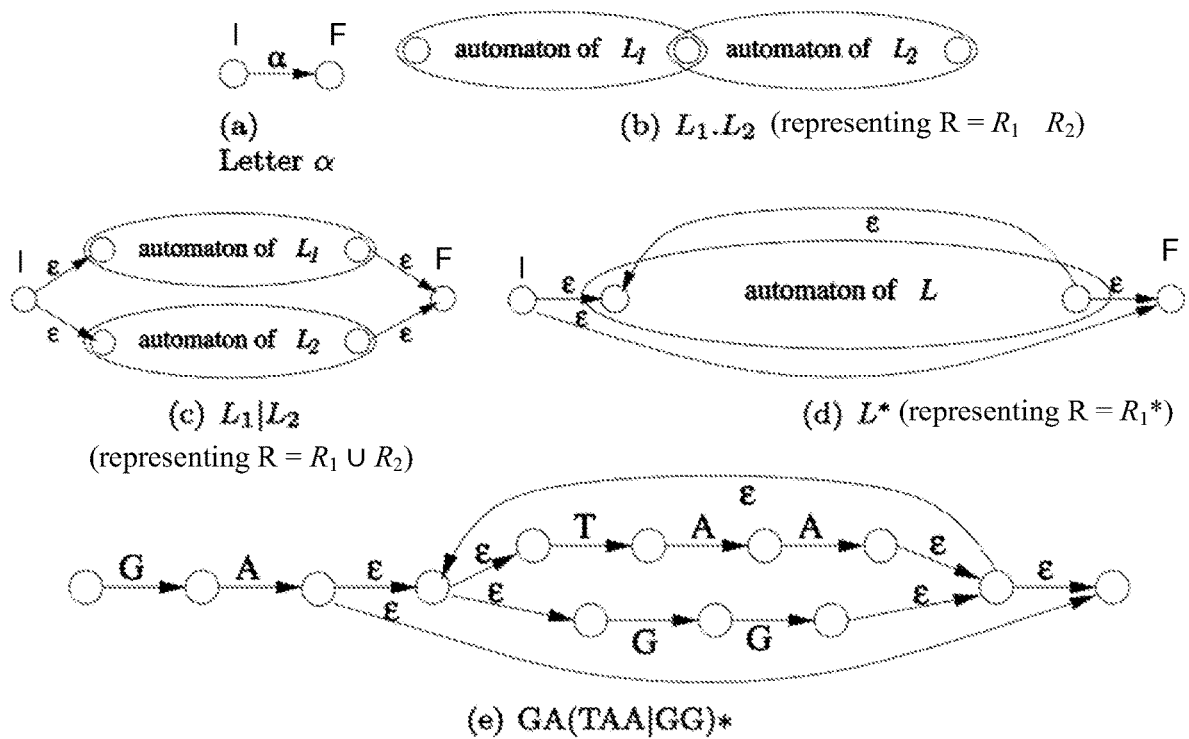
FIG. 6 shows patterns for recursively building Thompson's nondeterministic finite automaton (NFA) on a regular expression and an instance of such an automaton built on GA(TAA|GG)*.

More specifically, a Thompson's NFA is constructed for each regular expression that represents a sensitive-text type. As shown in FIG. 6, the Thompson's NFA comprises a plurality of nodes transition between each other. The nodes are generally of two types, including a first type of t-nodes (in which all ingoing transitions are F-transitions) and a second type of others nodes (denoted L-nodes). Herein a F-transition is a transition in NFA that the input thereof may be an empty string F.

As shown in FIG. 6, the construction Thompson's NFA is done recursively on the expression using the following rules:

Referring to FIG. 6(a), a regular expression consisting of a single character a generates an automaton with two states I and F, linked with one transition labeled with the character a. The state I is the initial state of the automaton and the state F is the accepting state of the automaton.

Referring to FIG. 6(b), a regular expression $R=R_1 \cdot R_2$ (that is, R is the concatenation of $R_1$ and $R_2$, where "·" represents concatenation), wherein $R_1$ and $R_2$ are represented as automaton of node $L_1$ and automaton of node $L_2$, respectively, generates an automaton $L_1 \cdot L_2$ which contains all original states and transitions of automatons of $R_1$ and $R_2$ except that the final state of automaton of $R_1$ is merged with initial state of the automaton of $R_2$.

Referring to FIG. 6(c), a regular expression $R=R_1 \cup R_2$ (that is, R is the aggregation of $R_1$ and $R_2$, where "$\cup$" represents union), wherein $R_1$ and $R_2$ are represented as automaton of node $L_1$ and automaton of node $L_2$, respectively, generates an automaton $L_1|L_2$ which contains the states and the transitions which appear in automaton of the regular expressions $R_1$, $R_2$ with two new states I, F and four new transitions labeled with ε.

Referring to FIG. 6(d), a regular expression $R=R_1*$, wherein $R_1$ is represented as automaton of node L, generates an automaton L* which contains all the original states of $R_1$ with two new states I, F and four new transitions labeled with ε.

An example of Thompson's NFA built on an exemplary regular expression "GA(TAA|GG)*" is shown in FIG. 6(e).

By using the Thompson's NFA constructed for the regular expression of each sensitive-text type, the fuzzy matching method scans the long text string T and counts the smallest Levenshtein distance between each possible substring $T_{i,j}$ of the long text string T and the final state in the Thompson's NFA. If a substring $T_{i,j}$ has a Levenshtein distance smaller than a predefined fuzziness threshold, the substring $T_{i,j}$ is considered a substring sensitive text.

After detecting a substring of sensitive text, the processing structure 122 includes the detected substring of sensitive text and the bounding box and sensitive-text type thereof into a sensitive-text list.

As described above, some sensitive-text types (such as credit card number, resident identity card number, and the like) may be validated at step 244 shown in FIG. 5.

For example, a 18-digit resident identity card number based on ISO 7064:1983, MOD 11-2 (see https://en.wikipedia.org/wiki/Resident_Identity_Card) may be expressed as, from left to right, $a_{18}, a_{17}, \ldots, a_1$, where $a_i$ ($i=1, \ldots, 18$) is a digit, and $a_1$ is a checksum for validating the first 17 digits, which is obtained by:

(i) Calculating a weight coefficient for each digit $a_i$ ($i=2, \ldots, 18$) as $W_i=2^{i-1}$ mod 11, where A mod B is the modulo operation returning the remainder of A divided by B.

(ii) Calculating $S=\Sigma_{i=2}^{18} a_i W_i$.

(iii) Calculating $a_1=(12-(S \mod 11)) \mod 11$.

Therefore, if a resident identity card number is detected at step 242 shown in FIG. 5, the processing structure 122 may calculate a checksum for the detected resident identity card number and compare the calculated checksum with the rightmost digit of the detected resident identity card number for validation.

As described above, the input image 202 may be modified to remove or otherwise sanitize the detected and optionally validated sensitive text therein and obtain the modified image 222.

The image-sanitization system 100 disclosed herein provides several advantages compared to conventional image-sanitization system.

For example, Presidio (which is a data protection and anonymization API developed by Microsoft Corp., Redmond, WA, USA; see https://github.com/microsoft/presidio) provides identification and anonymization functions for personal identifiable information (PII) entities in text and images.

The Presidio Image Redactor is a Python-based module for detecting and redacting PII text entities in images. Specifically, the Presidio Image Redactor defines a regex-based recognizer for each of sensitive data types. For example, the regular expression for IPv4 address is "\b(?:25[0-5]|2[0-4][0-9]|[01]?[0-9][0-9]?)\.(?:25[0-5]|2[0-4][0-9]|[01]?[0-9][0-9]?)\.(?:25[0-5]|2[0-4][0-9]|[01]?[0-9] [0-9]?)\.(?:25[0-5]|2[0-4][0-9]|[01]?[0-9][0-9]?)\b", and this regular expression is used in Presidio's IPv4 recognizer for matching IPv4 addresses in images. In operation, the Presidio Image Redactor uses OCR to recognize text in an image and then uses the regex-based recognizers one by one to detect sensitive text in the text obtained from the OCR.

Compared to Presidio which uses conventional regular expression for detecting sensitive text from images, the image-sanitization system 100 disclosed herein utilizes the above-described fuzzy matching method for sensitive-text detection, thereby greatly improving the detection rate (also denoted "recall rate") while maintaining sufficient precision (that is, the detection correctness) in image-based sensitive-text detection. The image-sanitization system 100 disclosed herein also utilizes image pre-processing operations to enhance image quality thereby improving the OCR accuracy.

FIG. 7 shows comparison results of the Presidio Image Redactor and the image-sanitization system 100 using images of different types (screenshots, scanned documents, and scanned receipts) obtained from a private dataset, the FUNSD open dataset (https://guillaumejaume.github.io/FUNSD/), the SROIE open dataset (https://rrc.cvc.uab.es/?ch=13), respectively) and having sensitive text of different sensitive-text types (IP address, phone number, and date). In the comparisons, the image-sanitization system 100 is tested with fuzziness thresholds of one (1), two (2), and three (3). As shown, the recall rates of the image-sanitization system 100 are all increased compared to those of the Presidio Image Redactor. For example, the recall rates of the image-sanitization system 100 with fuzziness of one and two in detecting phone numbers are increased by 18% and 25%, respectively, compared to that of the Presidio Image Redactor, while maintaining comparable precisions.

Also shown in the columns of time in FIG. 7, the image-sanitization system 100 does not degrade the system efficiency compared to Presidio that uses standard regular-expression matching.

Moreover, FIG. 7 shows that the image-sanitization system 100 supports a large range of sensitive-text types and various types of images.

Those skilled in the art will appreciate that various alternative embodiments are readily available. For example, the fuzziness threshold used in the image-sanitization system 100 may be adjustable by a user. As can be seen from FIG. 7, higher fuzziness thresholds may be used in applications that require higher recall rates, or lower fuzziness thresholds may be used in applications that need to maintain higher precisions.

In some embodiments, other suitable edit distance such as Hamming distance, Longest common subsequence (LCS) distance, Damerau-Levenshtein distance, Jaro-Winkler distance, and/or the like may be used for measuring the fuzziness between a regular expression and a substring in the recognized text strings.

In some embodiments, the image-based sensitive-text detection and sanitization process 200 shown in FIG. 4 may be executed by a plurality of processing structures 122 of a plurality of server computers 102. Each step may be performed by a respective program or program module running on a server computer 102.

In some embodiments, the image-based sensitive-text detection and sanitization process 200 may be performed by a client computing device 104. In these embodiments, the client computing device 104 may or may not be connected to the network 108.

In some embodiments, the image-based sensitive-text detection and sanitization process 200 may not comprise the image pre-processing step 204.

In some embodiments, at step 208 of the image-based sensitive-text detection and sanitization process 200, the processing structure 122 may convert the OCR detection results into a plurality of long text strings. Then, in step 210, the processing structure 122 uses the fuzzy matching method to separately process each long text string.

In some embodiments, the image-based sensitive-text detection and sanitization process 200 may not comprise the text mid-processing step 208. Then, in step 210, the processing structure 122 uses the fuzzy matching method to separately process each recognized text string.

In some embodiments, the predefined sensitive-text types may be user-customizable wherein a user (such as an administrator) may add, remove, and/or modify one or more sensitive-text types in the system 100.

While the image-based sensitive-text detection and sanitization process 200 in above embodiments is used for detecting sensitive text information in images, in other embodiments, the image-based sensitive-text detection and sanitization process 200 may be used for detecting sensitive text information in other types of input data.

For example, in some embodiments, the image-based sensitive-text detection and sanitization process 200 may be used for detecting sensitive text information in one or more frames of a video clip. In some other embodiments, the image-based sensitive-text detection and sanitization process 200 may be used for detecting sensitive text information in audio data. In these embodiments, instead of performing image pre-processing at step 204, suitable audio signal pre-processings may be performed at step 204. Moreover, instead of using OCR at step 206, voice recognition may be used for converting the audio signal to a text string. The sensitive-text recognition step 210 may be similar to that described above. At step 212, suitable audio processing technologies may be used to modify the audio signal and remove the detected sensitive text information.

In some embodiments, a first processing structure may recognize text strings from a signal such as an image, a video clip, an audio clip, or the like, and transmit the recognized text strings to a second processing structure for sensitive-text detection. After detecting the sensitive text information using the fuzzy matching method, the second processing structure transferring the list of detected substrings of sensitive text back to the first processing structure for redaction.

In some embodiments, the image-based sensitive-text detection and sanitization process 200 may not comprise the redaction step 212. Rather, the processing structure 122 may use the detected list of detected substrings to locate meaningful pieces of text inside image data and help to extract them for further process.

Although embodiments have been described above with reference to the accompanying drawings, those of skill in the art will appreciate that variations and modifications may be made without departing from the scope thereof as defined by the appended claims.

What is claimed is:

1. A method comprising:
   recognizing a text string from a signal;
   detecting, from the text string, a substring of a sensitive-text type based on a similarity between the substring and a regular expression, the regular expression defining a pattern for searching a text string and finding substrings matching the pattern; and
   modifying the signal by removing information related to the detected substring from the signal;
   wherein said detecting the substring comprises:
      detecting, from the text string, the substring if an edit distance between the substring and the regular expression is smaller than a predefined threshold.

2. The method of claim 1, wherein the signal comprises an image, a frame of a video clip, or an audio clip.

3. The method of claim 1 further comprising:
   processing the signal for correcting distortion to remove noise in the signal.

4. The method of claim 1, wherein the detecting the substring further comprises:
   verifying correctness of the detected substring.

5. The method of claim 1, wherein the edit distance is a Levenshtein distance between the substring and the regular expression.

6. The method of claim 1, wherein said detecting the substring comprises:
   detecting, from the text string, the substring if a smallest Levenshtein distance between the substring and a final state in a Thompson's nondeterministic finite automaton (NFA) corresponding to the regular expression is smaller than the predefined threshold.

7. The method of claim 1, wherein the regular expression corresponds to a predefined type of text.

8. An apparatus for executing instructions to perform actions comprising:
   recognizing a text string from a signal;
   detecting, from the text string, a substring of a sensitive-text type based on a similarity between the substring and a regular expression, the regular expression defining a pattern for searching a text string and finding substrings matching the pattern; and
   modifying the signal by removing information related to the detected substring from the signal;
   wherein said detecting the substring comprises:
      detecting, from the text string, the substring if an edit distance between the substring and the regular expression is smaller than a predefined threshold.

9. The apparatus of claim 8, wherein the signal comprises an image, a frame of a video clip, or an audio clip.

10. The apparatus of claim 8, wherein the actions further comprise:
    processing the signal for correcting distortion thereof and/or removing noise therein.

11. The apparatus of claim 8, wherein the actions further comprise:
    verifying correctness of the detected substring.

12. The apparatus of claim 8, wherein the edit distance is a Levenshtein distance between the substring and the regular expression.

13. The apparatus of claim 8, wherein said detecting the substring comprises:
    detecting, from the text string, the substring if a smallest Levenshtein distance between the substring and a final state in a Thompson's nondeterministic finite automaton (NFA) corresponding to the regular expression is smaller than the predefined threshold.

14. The apparatus of claim 13, wherein the regular expression corresponds to a predefined type of text.

15. A non-transitory computer-readable storage medium comprising computer-executable instructions, wherein the instructions, when executed, cause a processing structure to perform actions comprising:
    recognizing a text string from a signal;
    detecting, from the text string, a substring of a sensitive-text type based on a similarity between the substring and a regular expression, the regular expression defining a pattern for searching a text string and finding substrings matching the pattern; and
    modifying the signal by removing information related to the detected substring from the signal;
    wherein said detecting the substring comprises:
       detecting, from the text string, the substring if an edit distance between the substring and the regular expression is smaller than a predefined threshold.

16. The non-transitory computer-readable storage medium of claim 15, wherein the edit distance is a Levenshtein distance between the substring and the regular expression.

17. The non-transitory computer-readable storage medium of claim 15, wherein said detecting the substring comprises:
    detecting, from the text string, the substring if a smallest Levenshtein distance between the substring and a final state in a Thompson's nondeterministic finite automaton (NFA) corresponding to the regular expression is smaller than the predefined threshold.

* * * * *